United States Patent
Westerberg et al.

(10) Patent No.: US 7,742,418 B2
(45) Date of Patent: Jun. 22, 2010

(54) METHOD AND APPARATUS FOR DETERMINING LATENCY AND THROUGHPUT OF A DATA COMMUNICATION

(75) Inventors: Lars Erik Westerberg, Enskede (SE); Kenneth Balck, Linköping (SE); Martin Skarve, Enebyberg (SE); Mikael Soderstrom, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 450 days.

(21) Appl. No.: 11/892,670

(22) Filed: Aug. 24, 2007

(65) Prior Publication Data

US 2009/0054001 A1 Feb. 26, 2009

(51) Int. Cl.
*H04L 12/26* (2006.01)
(52) U.S. Cl. .................................. 370/235; 370/252
(58) Field of Classification Search ................. 370/235, 370/252, 253
See application file for complete search history.

(56) References Cited

U.S. PATENT DOCUMENTS

| | | | |
|---|---|---|---|
| 6,269,401 B1 * | 7/2001 | Fletcher et al. ............. | 709/224 |
| 2005/0265321 A1 * | 12/2005 | Rappaport et al. .......... | 370/352 |
| 2007/0115847 A1 | 5/2007 | Strutt | |
| 2007/0189262 A1 * | 8/2007 | Kim et al. ................... | 370/347 |
| 2008/0225842 A1 * | 9/2008 | Goldfein et al. ............ | 370/389 |

FOREIGN PATENT DOCUMENTS

| | | |
|---|---|---|
| EP | 1 447 937 | 8/2004 |
| EP | 1 610 495 | 12/2005 |

OTHER PUBLICATIONS

International Search Report and Written Opinion of the International Searching Authority mailed Nov. 24, 2008 in corresponding PCT Application PCT/EP2008/059038.
International Preliminary Report on Patentability, Mar. 4, 2010, in corresponding International Application No. PCT/EP2008/059038.

* cited by examiner

*Primary Examiner*—Ricky Ngo
*Assistant Examiner*—Luat Phung
(74) *Attorney, Agent, or Firm*—Nixon & Vanderhye P.C.

(57) ABSTRACT

The technology in this application determines the throughput over a data communication substantially as experienced by a user receiving the data. The determined throughput is substantially independent of the total amount of data transferred over the connection. This "active" throughput measure is divided into two parts to provide two performance measures: transfer throughput and latency. Latency corresponds to a time period needed to accomplish one or more functions associated with the data connection, like setting up and taking down the connection, during which payload type data to be transferred to an end user is not transferred. By identifying and removing the initial latency from the throughput determination for the data connection, the determined transfer throughput provides a more accurate measure of the throughput actually experienced by the end user.

25 Claims, 8 Drawing Sheets

METHOD AND APPARATUS FOR DETERMINING LATENCY AND THROUGHPUT OF A DATA COMMUNICATION

TECHNICAL FIELD

The technical field relates to data communications, and in particular, to determining a throughput of a data communications.

BACKGROUND

In cellular radio communication systems, it is important to monitor the performance of the end-user services, to identify areas of poor quality, and if possible, to improve performance by means of capacity upgrade and/or network tuning. For voice service, an example set of Key Performance Indicators (KPIs) could include: blocked calls, dropped calls, and voice quality. Radio network nodes can measure KPIs on a statistical basis per geographical area to enable the network operator to monitor the performance of the voice service delivered to mobile subscribers and to detect areas where service performance is below an acceptable level. The KPIs may also allow an operator to identify a root cause poor performance, e.g. an under-dimensioned radio base station (RBS) or faulty parameter settings for handovers in a cell relation. Accordingly, Key Performance Indicators should be carefully defined so that they accurately measure the performance of the service as experienced by the end-user and can be measured by one or more the radio network nodes.

With the rapid growth of data services in the cellular radio network there have been several attempts to define KPIs for best-effort data services. Although various mean throughput measures, dropped and blocked radio bearers measures, and measures on the level of radio protocols, e.g. on the RLC level, can be used, a problem arises if these measures are defined differently in different systems and in similar systems from different infrastructure vendors. For example, Ericsson and Nokia might use different measures in their respective GSM and WCDMA systems.

Another problem is KPI type measures that do not reflect the end-user perceived quality. This is particularly a concern in radio communication systems with high bandwidth such as HSPA, WiMAX, and LTE. For example, a KPI such as mean data rate does not accurately represent end-user-experienced performance because that indicator also includes periods of inactivity where there is no data to send in the transmit buffer for that end-user. The consequence is a substantial underestimation of the throughput that the end-user actually experiences.

One way to handle this "mean data rate" problem is to only measure the throughput when there is data to be sent to the end-user stored in a transmit or send buffer at the transmitter. Only measuring throughput during those times gets closer to the end-user perception as compared to a basic mean data rate KPI. But a problem with this approach is that it does not take into account that in most systems, there is an initial period of time from the first reception of data in an empty transmit buffer until the start of transmission of data from the transmit buffer during which no data can be transferred. This initial time during which the data connection is not transmitting the desired content to the end-user is in this application referred to as "latency." Latency components include, for example, a data transfer start-up time required before data content can actually be transferred. This may be due to internal node processing of user data, (e.g., encryption, coding, inspection, modulation, data transfer between internal buffers, or other internal handling), or set up of radio resources such as Radio Access Bearers and Radio Bearers in WCDMA and LTE or Temporary Block Flows in GSM. The initial latency can also be due to receiver sleep mode cycles corresponding to periods of time during which the receiver is not active. The latency of all the nodes in the system collectively contribute to a minimum end-to-end transfer time that it takes to transfer even the smallest data unit from one end of the system to the other and back, the so called end-to-end round-trip time of the system. The end-to-end round-trip time is an important characteristics of any data communication system and directly impacts the end-user perception of the system performance.

Consider an example of transferring an e-mail which can be separated into two phases, where the duration of the first phase depends almost entirely on the end-to-end round-trip time. In an email download, there first is a handshake phase in which various relatively small control messages are sent between the transmitter and receiver to set up and confirm the data connection. None of the substantive content of that email message is transferred during this first phase. The second phase is the download phase in which the email and any attachment is transferred over the data connection. A similar analysis holds for web browsing a web page that includes a set of objects. The objects are of different sizes and represent pictures, logotypes, text fields, animations, etc. HTTP establishes a TCP connection for downloading the objects in sequence. In between each object, there is some signaling, e.g., requesting the next object or keeping the HTTP download stable.

A mean throughput measure for short data transfers (i.e., there is only a small amount of data to transfer) that "counts" or includes the latency "overhead" time periods is much lower and typically quite different from the bandwidth the end user actually experienced. The end-user's experience of throughput is tied to the time periods during which desired data content is actually being transferred to the end user. For long data content transfers, (e.g., multiple seconds), the data transfer latency "overhead" periods have less impact because that latency time is small compared to the time of the total data transfer time. The undesirable result then is the usefulness of a mean throughput KPI value depends on the size or length of a data transfer rather than on the actual desired data payload throughput that the end-user experiences.

Shorter data transfers are common in broadband wireline networks and are becoming more of a problem in wireless systems where high bandwidth radio connections are becoming faster. For example, a webpage that takes 10 seconds to transfer in a GSM/WCDMA system over the wireless interface will take less than one second over the wireless interface in mobile broadband systems like LTE or WiMAX. Hence, throughput measures that do not compensate for the initial latency period of the transfers become more biased and less representative of the end-user experienced throughput in these and other high-bandwidth systems.

Another practical problem for network operators is vendor-specific KPIs, which make it difficult for an operator to compare end-user service performance with vendor A communications equipment with that of vendor B communications equipment. This also makes it difficult to set and follow up on national performance targets and to benchmark service performance. A resulting undesirable cost of vendor-specific KPIs is the effort needed to understand and benchmark the differences in the KPIs from different vendors and to create third-party products that can "translate" performance between them. It would therefore be advantageous to design key performance indicators that are defined by probes and events that occur on open standardized interfaces. KPIs defined in this way can be designed in any standard compliant product and benchmarked in an objective way between systems belonging to different operators, manufacturers, and standards.

SUMMARY

A latency time period and a desired payload data throughput associated with a data connection between a transmitter and a receiver are monitored. A determination is made when desired payload data for the receiver arrives at an empty transmit buffer in the transmitter and when an initial transmission of at least some of that data is received at the receiver. A latency time period associated with the transmission of the data is calculated. An end time of the data transfer is determined when all the data in the transmit buffer has been transmitted, (possibly also including new data that has arrived to the transmit buffer during transmission of the first data), and an amount of the data transmitted including the initial transmission through the end time. Then a data transfer throughput indicator is calculated for the data connection based on the amount of data transferred and a time period compensated for the latency time period. In a preferred embodiment, the calculated data transfer throughput indicator for the data connection substantially correlates with a data transfer throughput experienced by an end user sending or receiving data over the data connection and is substantially independent of a total size or amount of data transferred over the data connection.

Preferably, the time period is compensated so that it does not include some or all of the latency time period. In systems that use transmission time intervals, the time period usually includes multiple transmission time intervals, but preferably does not include the transmission time interval that transported a last portion of the data in the transmit buffer. The last transmission time interval is usually only partially used, and thus, gives an inaccurate throughput measure. Multiple data transfer throughput calculations for the data connection may be made over an averaging time period. The multiple data transfer throughput calculations are averaged for the data connection over the averaging time period.

In one non-limiting example implementation, the data connection alternates between time periods of uplink transmission only and time periods of downlink transmission only such as in Time Division Duplex (TDD) systems. In TDD systems, including, e.g., some configurations of WiMAX and TD-SCDMA technologies, downlink transmission time periods are different from uplink transmission time periods. In this example case, a relationship may be determined between downlink transmission time periods and uplink transmission time periods for the data connection. A downlink data transfer throughput for the data connection may then be calculated based on the amount of data transferred downlink and a downlink time period compensated for the latency time period during downlink transmission time period. Thereafter, the data transfer throughput for the data connection may be calculated based on the downlink data transfer throughput, the compensated downlink time period, and the relationship between downlink transmission time periods and uplink transmission time periods for the data connection.

The technology has broad application and may be flexibly implemented. For example, the transmitter and receiver can communicate over a wireless interface, or they can communicate over a wireline interface. The technology can be implemented in the transmitter, in both the transmitter and the receiver, or distributed across several nodes. In an example radio communications application, the technology may be implemented in a radio base station communicating with one or more user equipments over a radio interface and/or in a user equipment. In another example radio communications applications, the technology may be partly or completely implemented in the user equipment.

Accordingly, the technology in this application determines the throughput over a data communication substantially as experienced by a user receiving the data. The determined throughput is substantially independent of the total amount of data transferred over the connection. This "active" throughput measure is divided into two parts to provide two performance measures: transfer throughput and latency. Latency corresponds to a time period needed to accomplish one or more functions associated with the data connection, like setting up and taking down the connection, during which payload type data to be transferred to an end user is not transferred. By identifying and removing the initial latency from the throughput determination for the data connection, the determined transfer throughput provides a more accurate measure of the throughput actually experienced by the end user.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs). It will be apparent to one skilled in the art that other embodiments may be practiced apart from the specific details disclosed below.

Figure 1:
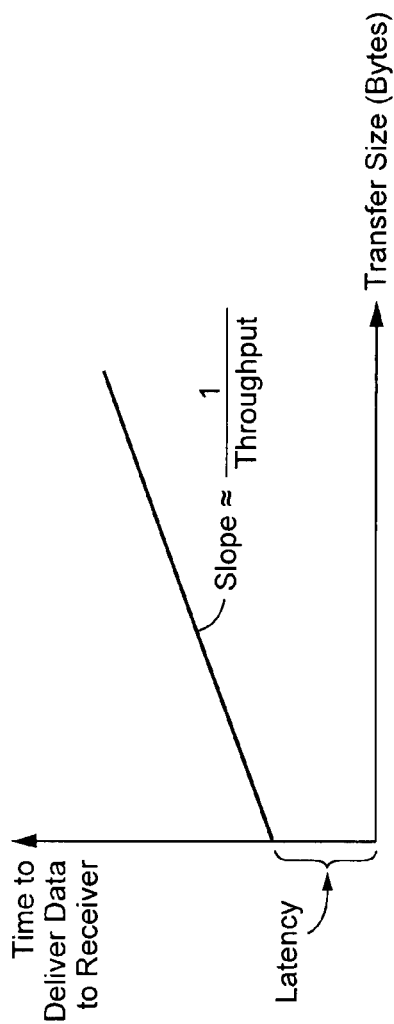
FIG. 1 is a graph that illustrates latency and desired data payload throughout.

FIG. 1 is a graph that illustrates latency and desired data payload throughput. The vertical axis plots the time to deliver data to a receiver against the size or amount of that data on the horizontal axis. What is significant about this graph is that there is a latency period while a data connection is being established (e.g., when signaling information is exchanged between sender and receiver) and inevitable delays involved in sending data before it can be received by a receiver. The latency period does not depend on the amount of desired payload data that is to be transmitted to the receiver over the data connection. During that latency period, the throughput is effectively zero. But as pointed out in the background, the end user usually experiences throughput, not during this latency period, but rather during the time when payload data is actually being transferred over the connection. The graph shows that after the latency period while payload data is being transmitted, the slope of the graph is relatively constant. In other words, the amount of time to deliver more payload data to the receiver increases linearly at a constant rate. The slope of the line is approximately inversely proportional to the throughput experienced by the end user at the receiver. The inventors recognized that it is this linear throughput that is typically the throughput value that end users and operators are more interested in, and hence, should be monitored and reported.

Figure 2:
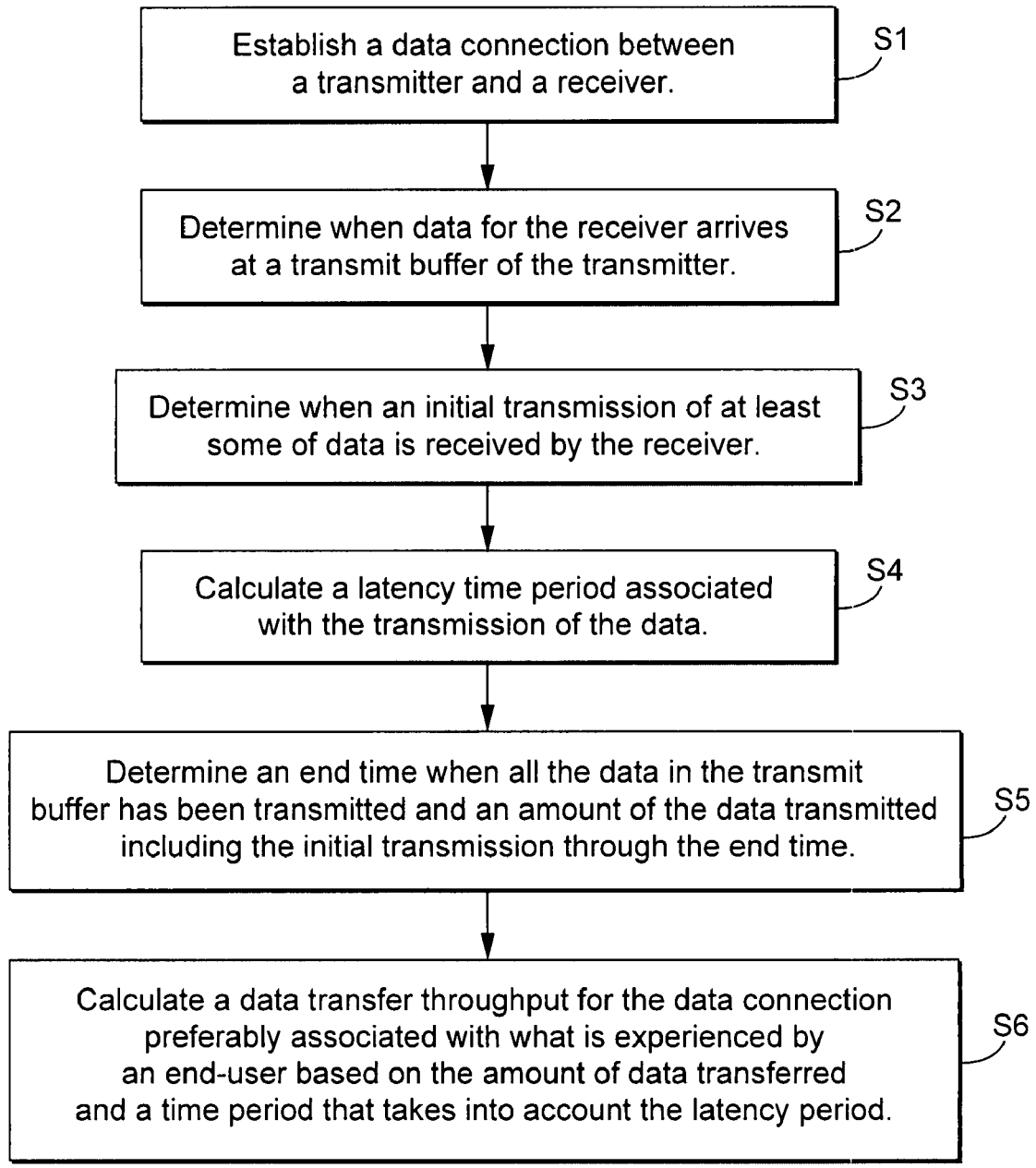
FIG. 2 is a flow diagram illustrating non-limiting, example procedures for determining a data throughput for a data connection representing throughput experienced by an end user.

FIG. 2 is a flow diagram illustrating non-limiting, example procedures for determining a data throughput for a data connection representing throughput experienced by an end user. Initially, a data connection is established between a transmitter and a receiver (step S1). A determination is made when data to be transmitted to the receiver arrives at a transmit buffer of the transmitter (step S2). It is then determined when an initial transmission of at least some of the buffered data is received by the receiver (step S3). A latency time period associated with the transmission of the data is calculated (step S4). A latency time period, like the example shown in FIG. 1, is a time period from when desired payload data to be transmitted is received in an empty transmit buffer until when the first of that data is received in the intended receiver. That latency is caused by internal node processing of user data, (e.g. encryption, coding, inspection, modulation, data transfer between internal buffers or other internal handling) or set up of resources, such as Radio Access Bearers and Radio Bearers in WCDMA and LTE or Temporary Block Flows in GSM if the communications system is a mobile radio communications system. In this same mobile radio environment, initial latency can also be due to receiver sleep mode cycles meaning short periods of time during which the receiver is not active. An end time is determined at the point when all the data in the transmit buffer has been transmitted (step S5). The amount of data transferred from the initial transmission through the end time is also determined. A data transfer throughput for the data connection is calculated based on the amount of data transferred during a time period that takes into account the latency period (step S6). Preferably, the data transfer throughput calculated is determined in such a way so as to reduce, minimize, or completely ignore the latency time period so that the throughput better reflects the throughput actually experienced by an end user at the receiver.

Figure 3:
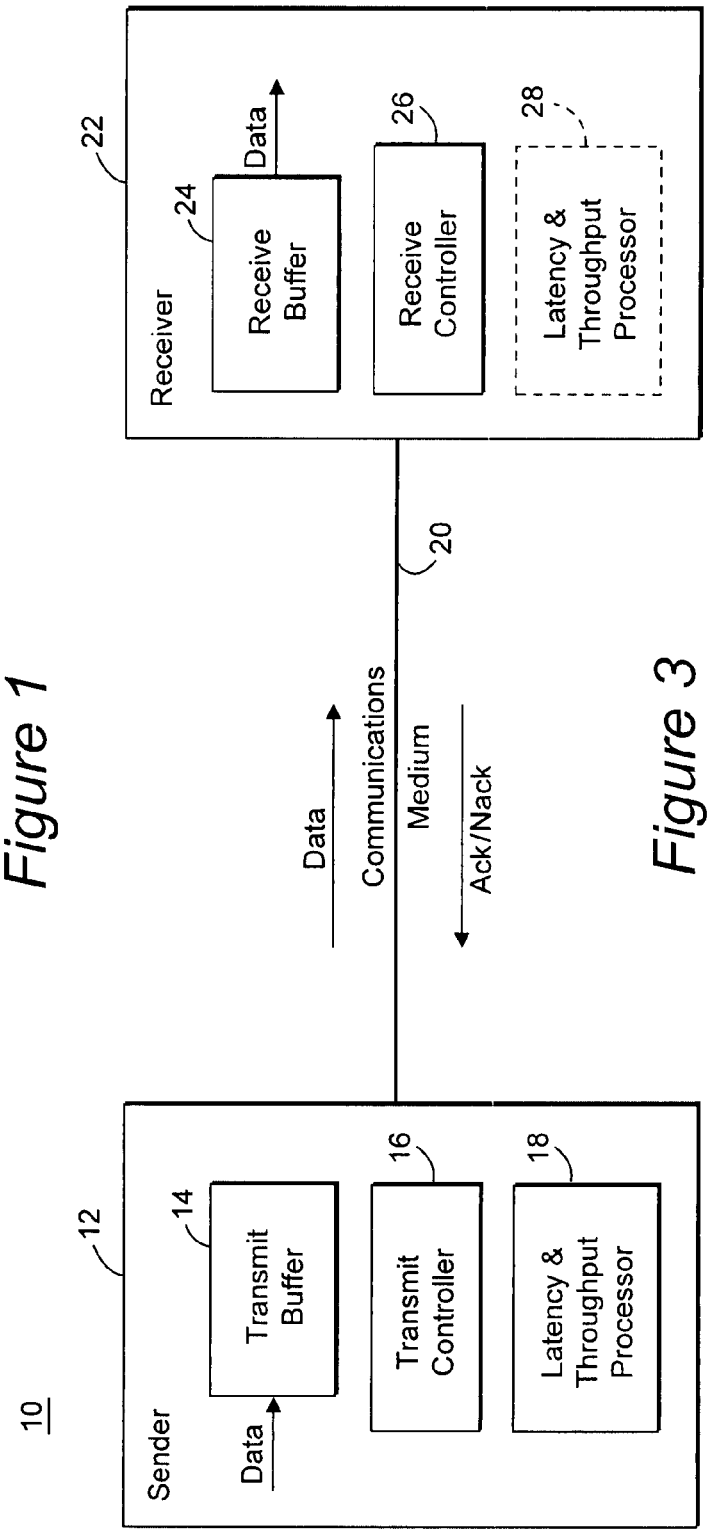
FIG. 3 is a function block diagram illustrating an example communications system.

FIG. 3 is a function block diagram illustrating an example communications system 10 including a transmitter or sender 12 and a receiver 22 that communicate over a communications medium 20. The communications medium 20 can be any suitable type including wire, cable, fiber, network, radio, infrared, etc. The sender node 12 includes among other things a transmit buffer 14 for receiving and buffering data to be transmitted to the receiver 22. A transmit controller 16 controls the transmit buffer 14 and transmission of data from the buffer 14 over the communications medium 20 to the receiver 22. A latency and throughput processor 18 monitors the data communications and performs functions (e.g., such as those described in FIG. 2) to determine a latency time period associated with sending the data to the receiver and a throughput associated with the data transmission that takes into account or compensates for the latency time period.

The receiver 22 includes a receive buffer 24 for receiving and storing data transmitted from the sender 12 over the communications medium 20 under the supervision of a receive controller 26. The controller 26 may send, for example, an acknowledgement or negative acknowledgement back to the sender 12 to indicate a successful or unsuccessful data transfer. The receiver 22 may also include a latency and throughput processor 28 that monitors the data communications and performs functions (e.g., such as those described in FIG. 2) to determine a latency time period associated with sending the data to the receiver and a throughput associated with the data transmission that takes into account or compensates for the latency time period. It is shown in dashed lines to indicate that it can perform those functions by itself or in conjunction with the latency and throughput processor 28. In an alternative example implementation, another node that communicates with the sender and/or receiver may perform the latency and throughput processing operations based on information provided from the sender and/or receiver.

Figure 4:
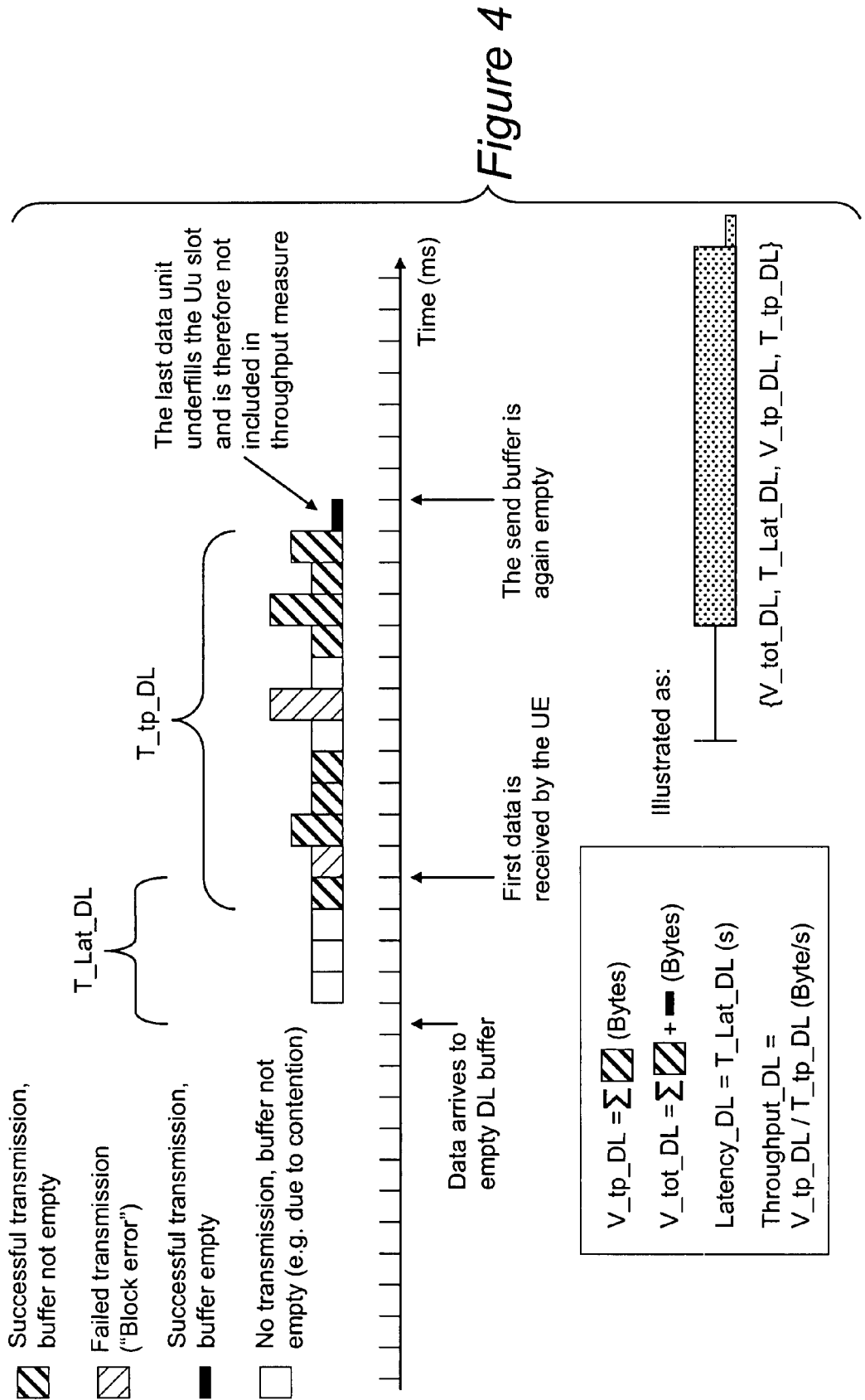
FIG. 4 is diagram illustrating an example data connection illustrating latency and data throughput components.

FIG. 4 is diagram illustrating an example data connection illustrating latency and data throughput where the transmission direction from sender to receiver is labeled "downlink (DL)." A time line for the data transmission is shown broken down into time transmission intervals (TTIs). During each TTI, a chunk of data can be transmitted. At higher data rates over the communications medium, the downlink buffer may be emptied rather quickly. Rather than simply measuring the total volume of data divided by the time to transfer that data volume, given that there may be significant latency and also some time periods where the transmit buffer is empty and no data is sent, in this example illustration, only those periods when there is data in the buffer actually being transmitted are included in the transport time. Moreover, there may be instances, typically during the last TTI, when the remaining amount of data will not fill one TTI period. As a result, it is preferable that data transfers not filling at least one TTI period not be included when assessing throughput. Accordingly, FIG. 4 shows an effective transport time T_tp_DL that does not include a latency time period T_Lat_DL or a last partially filled TTI.

The volume or amount of data actually transported, V_tp_DL, during the effective transport time T_tp_DL is the sum of the "successful transmission, buffer not empty" boxes shown in the Figure. Failed transmissions due to errors or no transmissions due to contentions for the communications medium are included as part of the effective transport time T_tp_DL but do not add any data to the volume or amount of data actually transported, V_tp_DL. The total data volume, V_tot_DL, may be determined by adding the small amount of data transported in the last TTI. The latency time period T_Lat_DL begins when data first enters the send buffer and ends when a first portion of that buffered data is received in the receiver. The effective transport time T_tp_DL overlaps the latency period by one TTI during which data is being transmitted but has not yet been fully received and thus detected as such by the receiver. The effective throughput may then be calculated by dividing V_tp_DL by T_tp_DL. The time line is represented as shown in the lower right hand corner of the Figure and is used in FIG. 5 to illustrate how an average effective throughput for the connection may be determined.

Figure 5:
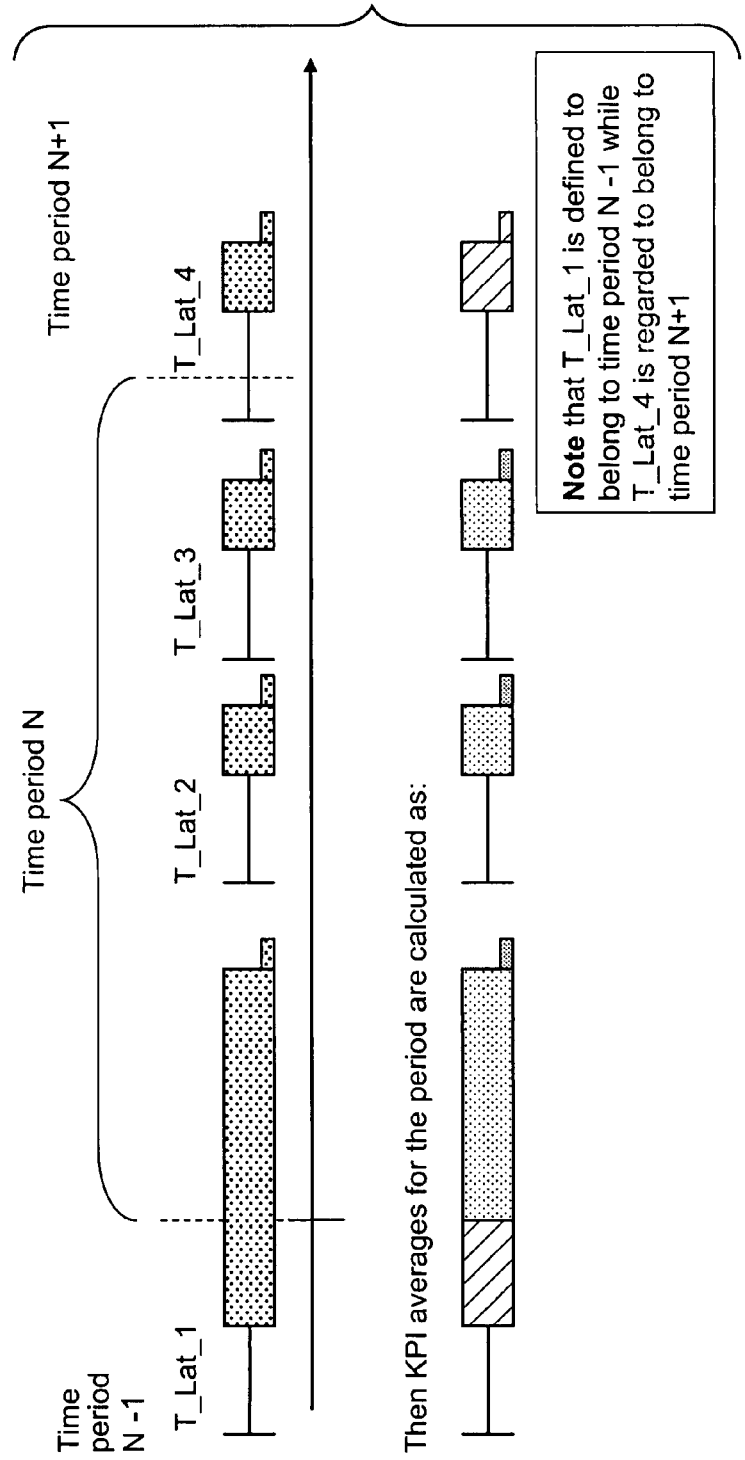
FIG. 5 is diagram illustrating an example for averaging multiple data throughputs determined for a particular connection.

FIG. 5 is diagram illustrating an example for averaging multiple data throughputs determined for a particular connection. T_Lat_1 is defined to belong to a time period N−1, and T_Lat_4 is defined as belonging to a time period N+1. The average throughput may then be calculated as:

$$\text{Throughput\_DL} = V\_tp\_DL/T\_tp\_DL (\text{Byte/s})$$

Figure 6:
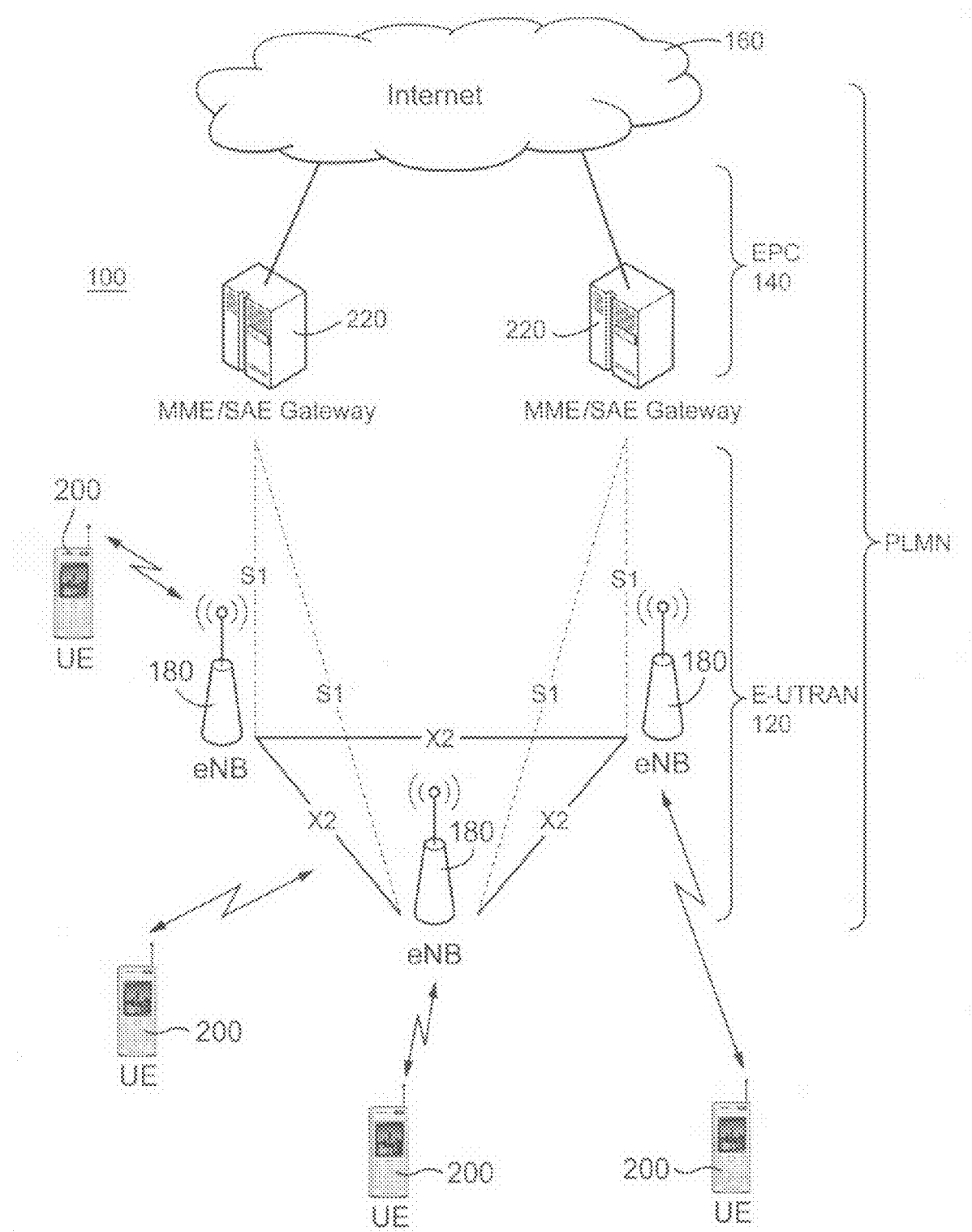
FIG. 6 is a function block diagram illustrating a non-limiting radio communications system as one example of a wireless communications environment in which this technology may used.

The technology described above may be useful for example in an evolved 3GPP UMTS system such as Long Term Evolution (LTE) where higher data rates over the wireless radio interface are expected which increase the likelihood of an empty buffer (particularly in the base station). An example LTE system 100 is shown in FIG. 6. Of course, the technology may be used in any modern radio communications systems such as GSM, WCDMA, HSPA and WiMAX. For ease of description, a user equipment (UE) may be referred to without limitation as a user terminal or a mobile terminal, and an eNodeB may be referred to using the more general and familiar term base station. It should be understood that the technology is not limited to radio communication systems, but can also be applied to wireline systems such as ADSL, VDSL as well as to fiber-based technologies, e.g., GPON.

Universal Mobile Telecommunications System (UMTS) is a 3rd Generation (3G) asynchronous mobile communication system operating in Wideband Code Division Multiple Access (WCDMA) based on European systems, Global System for Mobile communications (GSM) and General Packet Radio Services (GPRS). The Long Term Evolution (LTE) of UMTS is under development by the 3rd Generation Partnership Project (3GPP) which standardized UMTS. There are many technical specifications hosted at the 3GPP website relating to Evolved Universal Terrestrial Radio Access (E-UTRA) and Evolved Universal Terrestrial Radio Access Network (E-UTRAN), e.g., 3GPP TS 36.300. The objective of the LTE work is to develop a framework for the evolution of the 3GPP radio-access technology towards a high-data-rate, low-latency and packet-optimized radio-access technology. In particular, LTE aims to support services provided from the packet switched (PS)-domain. A key goal of the 3GPP LTE technology is to enable high-speed packet communications at or above about 100 Mbps.

In the example LTE type mobile communications system 100, a E-UTRAN 120 includes E-UTRAN NodeB (eNodeBs or eNBs) 180 that provide E-UTRA user plane and control plane protocol terminations towards the user equipment (UE) 200 over a radio interface. Although an eNB is a logical node, often but not necessarily implemented by a physical base station, the term base station is used here to generally cover both logical and physical nodes. The eNBs are interconnected with each other by means of an X2 interface. The eNBs are also connected by means of the S1 interface to an Evolved Packet Core (EPC) 140 which includes a Mobility Management Entity (MME) by an S1-MME and to a System Architecture Evolution (SAE) Gateway by an S1-U. The MME/SAE Gateway are referenced as a single node 220 in this example. The S1 interface supports a many-to-many relation between MMEs/SAE Gateways and eNBs. The E-UTRAN 120 and EPC 140 together form a Public Land Mobile Network (PLMN). The MMEs/SAE Gateways 220 are connected to directly or indirectly to the Internet 160 and to other networks.

Figure 7:
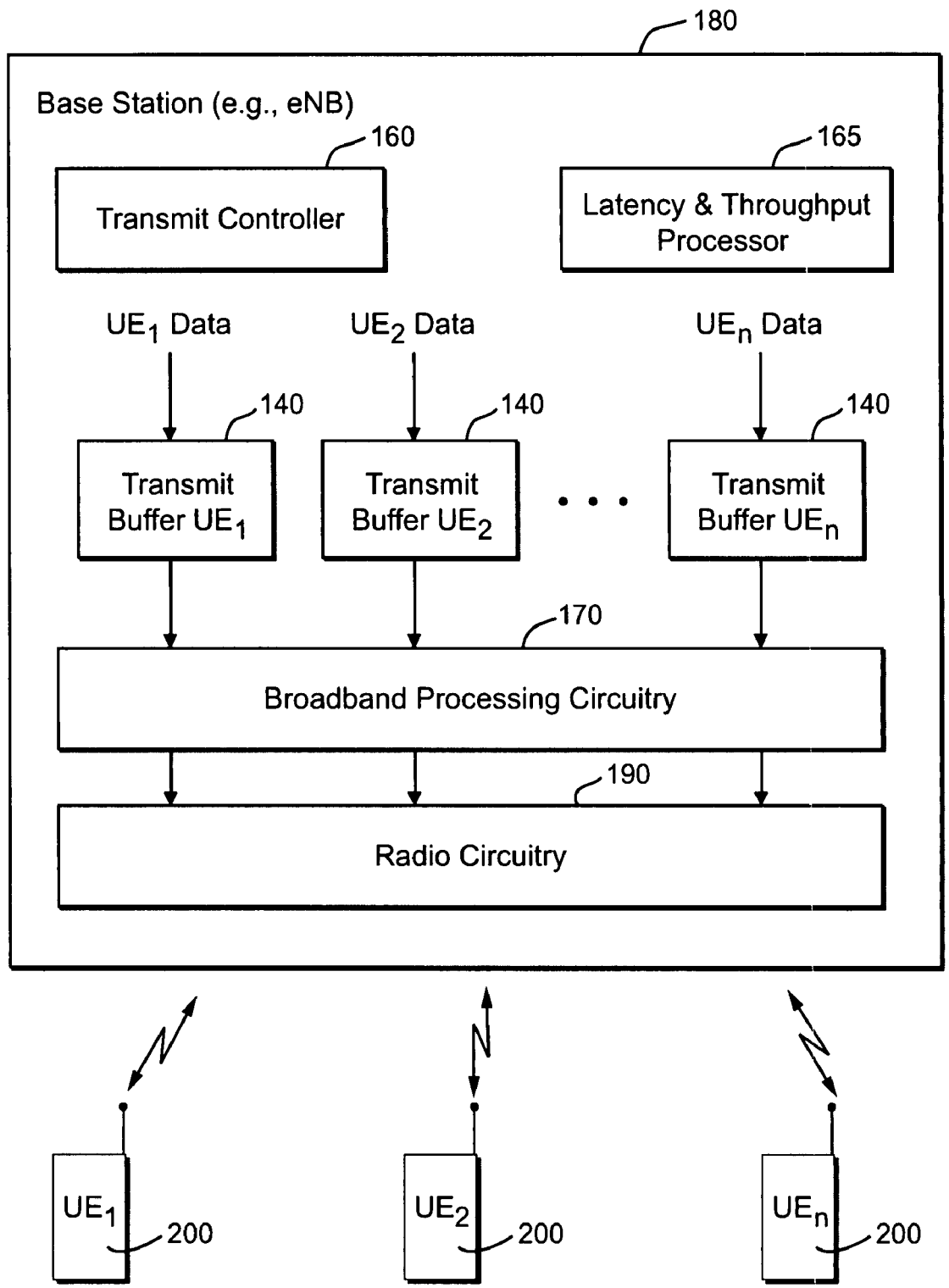
FIG. 7 illustrates a non-limiting example implementation of this technology in a radio base station.

FIG. 7 illustrates a non-limiting example implementation of this technology in a radio base station 180, although the technology may also be implemented in a UE 200. The base station 180 is shown configured to transmit data to multiple UEs 200 and includes a transmit controller 160 to control that process. Data for $UE_1, UE_2, \ldots, UE_n$ are provided to respective transmit buffers 140. Data from those buffers is processed in broadband processing circuitry (e.g., coding, modulation, etc.) and upconverted to radio frequency and transmitted over the air by radio circuitry 190. A latency and throughput processor 165 monitors the transmit buffers and transmissions to each UE 200 and performs the functions described above examples of which were illustrated in FIGS. 2 and 4 to calculate for each data transmission to one or more of the UEs a latency time period and an effective throughput, either instantaneous and/or average.

Figure 8:
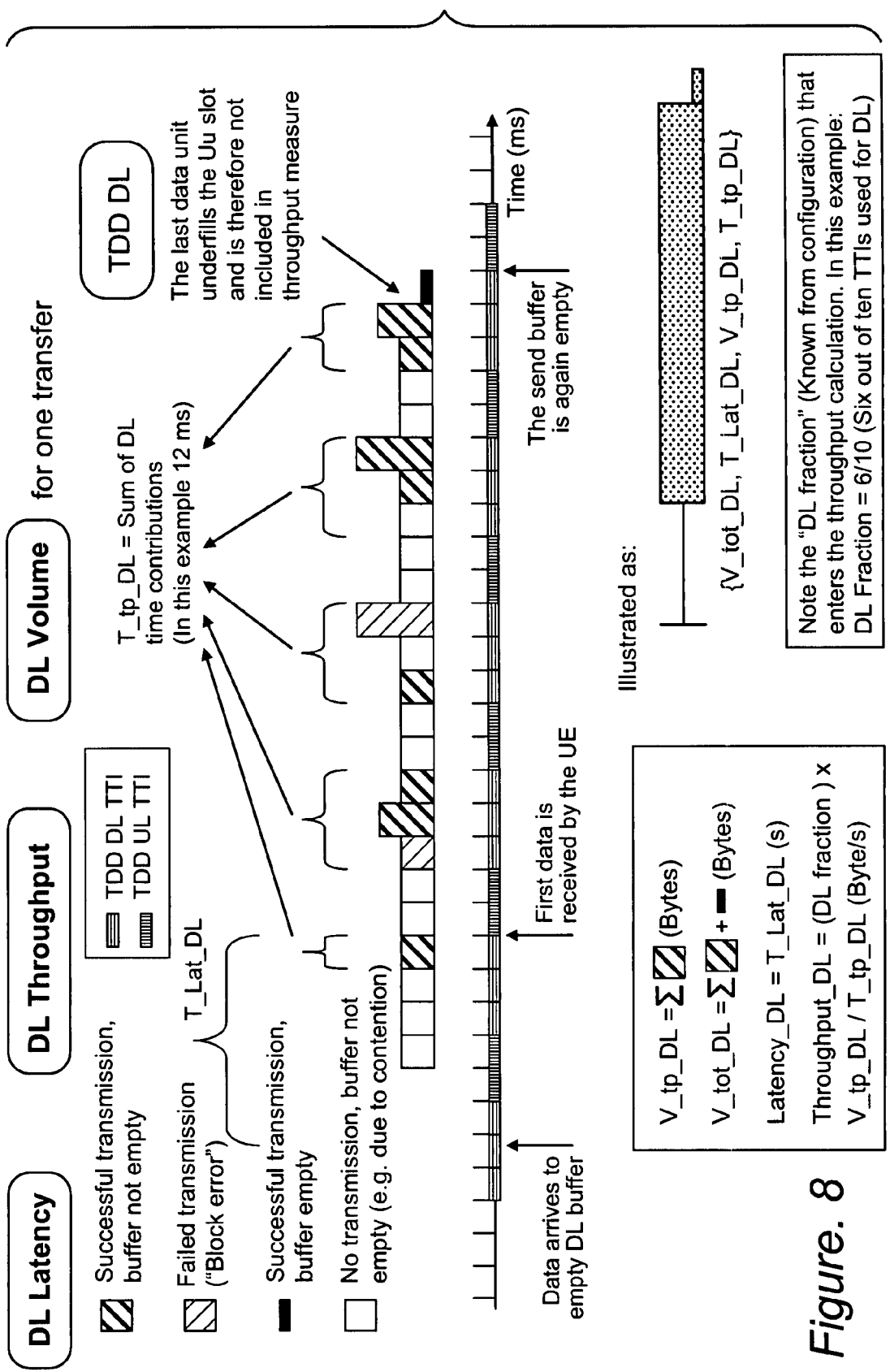
FIG. 8 is diagram illustrating an example base station-UE data connection illustrating latency and data throughput components in a TDD type system.

FIG. 8 is diagram illustrating an example base station-UE data connection illustrating latency and data throughput components for the base station 180 from FIG. 7 in a TDD system. This figure is similar to FIG. 4 but is adapted for a time division duplex (TDD) type access system. The throughput is calculated as:

$$\text{Throughput\_DL} = (DL \text{ fraction}) \times V\_tp\_DL/T\_tp\_DL$$

The "DL fraction" is the amount of time relative to the total communications time that the system is in a downlink transmit period. Of course, if no time constraints are imposed on when the sender or receiver can communicate, then the DL fraction would be "1". In this example, DL Fraction=6/10 because six out of ten TTIs are used for DL transmission (transmission from the network to the UE), while four out of ten TTIs are used for transmission from the UEs to the network (uplink time periods). The multiplication with the factor "DL Fraction" compensates for time during which transmission in the monitored direction cannot take place due to the TDD structure of the system and ensures that the resulting monitored throughput reflects the throughput as experienced by the end user.

Figure 9:
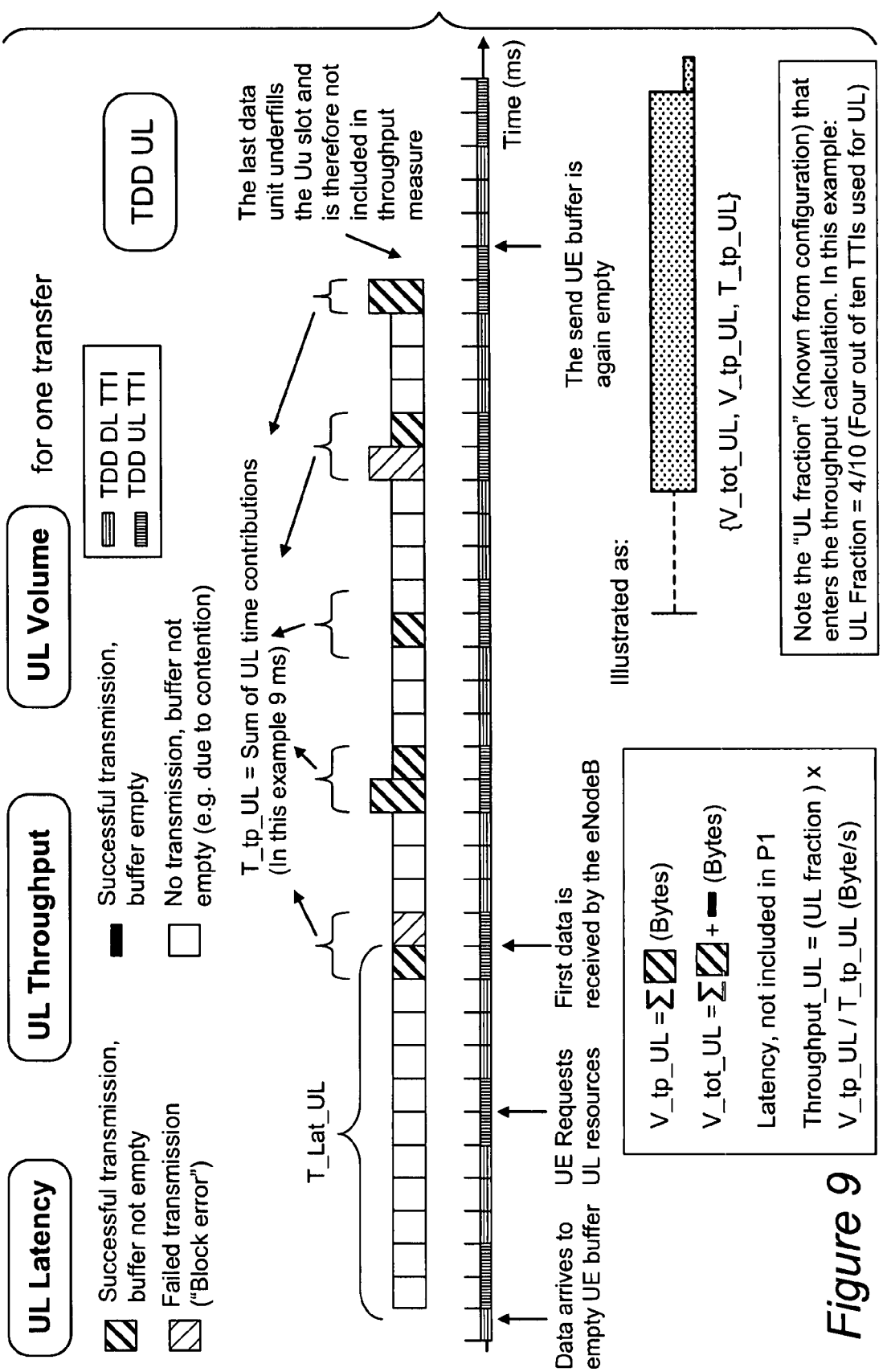
FIG. 9 is a diagram illustrating an example UE-base station data connection illustrating latency and data throughput components in a TDD type system.

FIG. 9 is a diagram illustrating an example UE-base station data connection illustrating latency and data throughput components as implemented in a UE in a TDD type access system. FIG. 9 is similar to FIG. 8 and the uplink throughput is calculated as:

$$\text{Throughput\_UL} = (UL \text{ fraction}) \times V\_tp\_UL/T\_tp\_UL$$

The technology described above also has broad application to flexibly monitor throughput and latency on a per user level, on a per data flow level, or aggregated over more than one user, e.g., on a per cell level. In one example application, the transmit buffer may be a transmit buffer containing packet to one data flow only, e.g., a Voice over IP (VoIP) flow where the flow transports data packets containing voice frames only. The technology can also be applied to a second flow related to a second transmit buffer. The second flow could be, for example, related to the transfer of best effort data, meaning that the second buffer contains data packets associated with a best effort internet connection. In this case, the technology can be used to measure the latency and throughput of the two flows independently from each other. The two flows could be either to the same user or two different users.

In yet another example application, the transmit buffer contains packet related to all transfers and flows between the transmitter and the receiver. The technology may be used in this example to measure the total latency and throughput to one end-user, aggregated over all flows and transfers.

In further example application, the transmit buffer contains packets related to all transfers and flows between the transmitter and multiple receivers and users. The total latency and throughput is determined in a serving area such as a radio network cell aggregated over all flows, users, and transfers.

The technology described above solves the technical problems described in the background and has very broad application to many data communications systems independent of the communications medium, access method, etc. For example, the technology enables a operator to measure and monitor the quality of offered data services as experienced by end-users in the system. The operator can also use this technology to identify poor system performance, to find bottlenecks, and to identify nodes and equipment that need to be upgraded, expanded, or tuned. The latency and throughput characteristics of the system may be measured which are directly correlated to download times of web pages, e-mails, files, and more, as measured by the end-user. Latency and throughput measures may also be provided across open standardized interfaces which enables objective performance evaluations and benchmarks between systems from different operators and vendors. Another advantage is that performance measures are provided that can be used in both low-bandwidth systems such as GPRS and high band-width systems (such as HSPA, LTE, VDSL and fiber networks) alike. Furthermore, the techniques described above may be applied to provide objective benchmarking between different technologies. To an operator, this means that the same performance measures and targets can be used, e.g., in a combined GSM/WCDMA/LTE network.

Although various embodiments have been shown and described in detail, the claims are not limited to any particular embodiment or example. For example, although primarily described in terms of scrambling sequences, the two type approach described for random access scrambling sequences may also be used for determining reference signal sequences sent in each uplink frame which are used by the base station receiver for uplink channel estimation purposes. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for monitoring a latency and a throughput associated with a data connection between a transmitter and a receiver, comprising the following steps:
    (a) determining, by the transmitter, when data for the receiver arrives at a transmit buffer in the transmitter;
    (b) determining when an initial transmission of at least some of the data is received at the receiver;
    (c) calculating a latency time period associated with the initial transmission of the data based on steps (a) and (b);
    (d) determining an end time when all the data in the transmit buffer has been transmitted and an amount of the data transmitted including the initial transmission through the end time; and
    (e) calculating a data transfer throughput indicator for the data connection based on an amount of data transferred and a time period compensated for the latency time period,
    wherein the time period does not include some or all of the latency time period.

2. The method in claim 1, wherein the time period includes multiple transmission time intervals and does not include the transmission time interval that transported a last portion of the data in the transmit buffer.

3. The method in claim 1, further comprising:
    making multiple data transfer throughput calculations for the data connection over an averaging time period, and
    averaging the multiple data transfer throughput calculations for the data connection over the averaging time period.

4. The method in claim 1, wherein the calculated data transfer throughput indicator for the data connection substantially correlates with a data transfer throughput experienced by an end user sending or receiving data over the data connection and is substantially independent of a total size or amount of data transferred over the data connection.

5. The method in claim 1, wherein the data connection includes downlink transmission time periods that are different from uplink transmission time periods, and wherein the method further comprises:
    determining a relationship between downlink transmission time periods and uplink transmission time periods for the data connection;
    calculating a downlink data transfer throughput for the data connection based on the amount of data transferred downlink and a downlink time period compensated for the latency time period during downlink transmission time periods; and
    calculating the data transfer throughput for the data connection based on the downlink data transfer throughput, the compensated downlink time period, and the relationship between downlink transmission time periods and uplink transmission time periods for the data connection.

6. The method in claim 1, wherein the transmitter and receiver communicate over a wireless interface.

7. The method in claim 1, wherein the transmitter and receiver communicate over a wireline interface.

8. The method in claim 1, wherein steps (a)-(e) are implemented in the transmitter.

9. The method in claim 1, wherein one or more of the steps (a)-(e) are implemented in the transmitter and one or more of the steps (a)-(e) are implemented in the receiver.

10. The method in claim 1, wherein one or more of the steps (a)-(e) are implemented in the transmitter and one or more of the steps (a)-(e) are implemented in a network or operations node.

11. The method in claim 1, wherein steps (a)-(e) are implemented in a radio base station communicating with one or more user equipments over a radio interface.

12. The method in claim 1, wherein some of the steps (a)-(e) are implemented in a user equipment communicating with a radio base station over a radio interface.

13. The method in claim 1, wherein the initial transmission includes an amount of data transmitted during a transmission time interval (TTI) and the data is delivered in multiple TTIs.

14. The method in claim 1, wherein the transfer throughput indicator is reported to an operations and maintenance system.

15. The method in claim 1, wherein the transmit buffer contains data associated with just a single data flow.

16. The method in claim 1, wherein the transmit buffer contains data associated with just a single user equipment.

17. Apparatus for monitoring a latency and a throughput associated with a data connection between a transmitter including a transmit buffer and a receiver, comprising electronic circuitry configured to:
determine when data for the receiver arrives at a transmit buffer in the transmitter;
determine when an initial transmission of at least some of the data is received at the receiver;
based on the data arrival at the buffer and the initial transmission, calculate a latency time period associated with the initial transmission of the data;
determine an end time when all the data in the transmit buffer has been transmitted and an amount of the data transmitted including the initial transmission through the end time; and
calculate a data transfer throughput indicator for the data connection based on an amount of data transferred and a time period compensated for the latency time period,
wherein the time period does not include some or all of the latency time period.

18. The apparatus in claim 17, wherein the time period includes multiple transmission time intervals and does not include the transmission time interval that transported a last portion of the data in the transmit buffer.

19. The apparatus in claim 17, further comprising electronic circuitry is configured to:
make multiple data transfer throughput calculations for the data connection over an averaging time period, and
average the multiple data transfer throughput calculations for the data connection over the averaging time period.

20. The apparatus in claim 17, wherein the calculated data transfer throughput indicator for the data connection substantially correlates with a data transfer throughput experienced by an end user sending or receiving data over the data connection and is substantially independent of a total size or amount of data transferred over the data connection.

21. The apparatus in claim 17, wherein the data connection includes downlink transmission time periods that are different from uplink transmission time periods, and wherein the electronic circuitry is configured to:
determine a relationship between downlink transmission time periods and uplink transmission time periods for the data connection;
calculate a downlink data transfer throughput for the data connection based on the amount of data transferred downlink and a downlink time period compensated for the latency time period during downlink transmission time periods; and
calculate the data transfer throughput for the data connection based on the downlink data transfer throughput, the compensated downlink time period, and the relationship between downlink transmission time periods and uplink transmission time periods for the data connection.

22. The apparatus in claim 17, wherein the transmitter and receiver communicate over a wireless or a wireline interface.

23. The apparatus in claim 17, wherein the apparatus is implemented in a base station.

24. The apparatus in claim 17, wherein the apparatus is implemented in mobile radio station.

25. The apparatus in claim 17, wherein the apparatus is distributed over multiple nodes.

* * * * *